United States Patent Office ==

3,341,476
Patented Sept. 12, 1967

3,341,476
FLUORINATED COPOLYMERS OF ALKYLENE IMINES
Carl C. Thurman, Jr., Lake Jackson, James S. Scruggs, Angleton, and Fred N. Teumac, Lake Jackson, Tex., assignors to The Dow Chemical Company, Midland, Mich., a corporation of Delaware
No Drawing. Filed Dec. 21, 1962, Ser. No. 246,370
16 Claims. (Cl. 260—2)

This invention relates to polymeric reaction products of alkylene imines and fluorinated unsaturated hydrocarbons and a method whereby these copolymers are made.

It is known that vicinal alkylene imines (aziridines) such as ethylenimine and propylenimine will react with olefins under the proper conditions to form the corresponding N-substituted aziridines. It is also known that certain polyfluorinated olefinic compounds will react similarly with molar equivalent or lesser amounts of these imines to make N-polyfluoroalkyl aziridines and, further, that these compounds thereby obtained can be converted into water-insoluble homopolymers. These latter reactions are described in the corresponding application of one of us, Serial No. 194,187, filed May 11, 1962.

It has now been found that when one or more aliphatic unsaturated fluorocarbons of the type described in the above application are contacted with a molar excess of at least one lower alkylene imine, an exothermic reaction occurs which proceeds to the formation of a polymeric material, the structure of which is essentially linearly polymerized alkylene imine wherein there is random substitution of some of the nitrogen atoms with polyfluorohydrocarbon groups and probably some fluorocarbon groups are included as units of the polymer chain. The proportion of such hydrophobic substituted to hydrophilic unsubstituted nitrogen atoms depends upon the relative amounts of reactants used and by varying the ratio of these mutually antagonistic groups in the polymers, materials ranging from water-soluble viscous liquids to hard, water-resistant moldable solids can be produced. Because of their structure, these copolymers have particularly useful and unique properties which distinguish them from both polymerized alkylene imines and homopolymers of the N-polyfluoroalkyl aziridines shown in the above-mentioned application.

The unsaturated fluorocarbons which are capable of undergoing the present reaction comprise generally those described in the previous application, i.e., perfluorinated olefins or their derivatives wherein one fluorine atom is replaced by a hydrogen atom, another halogen atom, or a cyano group. Particularly useful products are obtained by reacting an excess of a lower alkylene imine with an unsaturated fluorocarbon containing from two to about six carbon atoms wherein the unsaturation is present in the molecule either as an olefinic double bond or as an acetylenic triple bond. These fluorocarbons have the formula $C_nF_{2n-2a}$ where $n$ is an integer from two to about six and $a$ is zero or one. Representative compounds are tetrafluoroethylene, hexafluoropropylene, tetrafluoropropyne, hexafluorobutyne, and dodecafluorohexene.

By vicinal lower alkylene imine is meant ethylenimine and alkyl substituted ethylenimines, such as propylenimine and butylenimine containing from two to about four carbon atoms.

The imine and unsaturated fluorocarbon reactants are combined in a ratio of about 2 to about 25 moles of imine to one mole of fluorocarbon. Preferably from 3 to about 20 moles of imine are combined with a mole of fluorocarbon to obtain copolymers of particular value.

The molecular structure of the copolymers thereby obtained is not known with certainty, but it is believed to contain the fluorocarbon component both as a unit in a linear chain and as a substituent attached to the polymer chain at an imino nitrogen link thereof. This picture of the internal structure of these polymers is offered only as a hypothetical explanation of their nature, however, and the present invention is not to be understood as necessarily restricted thereto. Elemental analysis indicates that the imine and fluorocarbon components are present in the polymers in substantially the same proportion in which they are reacted. These polymers, therefore, contain these components chemically combined with one another in the relative proportions indicated by the formula

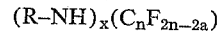

$$(R-NH)_x(C_nF_{2n-2a})$$

wherein R is vicinal lower alkylene, $n$ and $a$ are integers as defined above, and $x$ is a number from 2 to about 25, preferably about 3–20.

The reaction is operable within a temperature range of about 0° C. to about 80° C. Lower temperatures cause impractically low rates of reaction. Above about 80° C., homopolymerization of the imine increases to such a rate that the fluorocarbon unsaturate is excluded from the reaction. Most advantageous results are obtained at about 30–70° C.

The reaction is best carried out by introducing the fluorocarbon reactant into the alkylene imine in the liquid state at such a rate that the often considerable heat of reaction can be conveniently and uniformly removed. Inert solvents may be used if desired to dilute the reaction mixture and facilitate temperature control. Such solvents include unreactive hydrocarbons, for example, benzene, hexane, and cyclohexane, and other solvents inert under the reaction conditions such as diethyl ether, saturated fluorocarbons, and water. Water is found to be particularly useful in some reactions because of its high heat capacity.

The reaction is ordinarily carried out under substantially atmospheric pressure. Higher pressures may be used to facilitate the reaction by increasing the solubility of the unsaturated fluorocarbon in the imine.

Separation of the product from the reaction mixture usually offers no problem, since the reaction goes essentially to completion under normal operating conditions. Any solvent employed or small quantities of unreacted monomers can be removed easily by conventional methods such as distillation or extraction.

Polymers of particular value are obtained by the further interaction of double bonds present in copolymers made by reacting an alkylene imine with a fluorocarbon having more than simple olefinic unsaturation. For example, the olefinic double bonds present in the copolymers of an imine with an acetylenic fluorocarbon can be induced to interpolymerize to make hard and thermally stable crosslinked polymers resembling epoxy resins in some of their properties. Such further polymerization of these copolymers can be caused by conventional methods, for example, by subjecting the polymers to free radical initiating conditions such as contact with peroxy catalysts, high energy ionizing radiation, or even by moderate heating. Exposure to atmospheric oxygen at room temperature is often sufficient.

*Example 1*

A quantity of 127.2 g. of ethylenimine was put in a sealed reaction flask equipped with a water-cooled condenser, thermometer, and a gas inlet tube terminating in a fritted glass sparger tip near the bottom of the flask. The flask was immersed in a water bath for temperature control. Over a period of 16 hours, 59 g. of tetrafluoroethylene was introduced through the sparger into the ethylenimine at a temperature of 55–60° C. The exothermic reaction was essentially instantaneous under these conditions. After all the fluorocarbon had been added, the reaction mixture set to an amber solid, softening at about 150° C., soluble in water and alcohol but insoluble in benzene, chloroform, and ether. Analysis of this product showed 20.1% total nitrogen and 26.4% fluorine and an approximate molecular weight of 3800. A 10% by weight aqueous solution of the polymer had a density at 25° C. of 1.0283 and a viscosity of 5.25 centistokes.

*Example 2*

By the procedure described in Example 1, 10.7 g. of tetrafluoroethylene was reacted with 117.6 g. of ethylenimine at 56° C. to produce an opaque viscous liquid copolymer. This was found upon analysis to contain 30.0% nitrogen and 7.95% fluorine. It was soluble in water and alcohol, insoluble in most organic solvents. A 10% aqueous solution had a density at 25° C. of 1.0242 and a viscosity of 2.07 centistokes.

*Example 3*

A solution of 100 g. of ethylenimine in 100 g. of water was put in the reaction flask of Example 1 and 77 g. of hexafluoropropylene was added through the sparger in 24 hours, the temperature being maintained at 31.5° C. throughout the reaction. The copolymer obtained was a yellow solid, melting at 320° C., and containing 23.8% nitrogen and 15.4% fluorine by analysis.

*Example 4*

Example 3 was repeated at 55–60° C., thereby obtaining a much faster rate of reaction. The copolymer obtained was similar to the product of the lower temperature reaction.

*Example 5*

In the manner previously shown, 33 g. of hexafluoropropylene was added to 84.8 g. of ethylenimine at about 55° C. to produce a viscous liquid containing 26.7% nitrogen and 8.95% fluorine by elemental analysis. This copolymer was similar in its physical properties to the product of Example 2.

*Example 6*

Using the procedure shown above, hexafluoro-2-butyne was added to about a 5/1 molar excess of ethylenimine at about 50–60° C. A brown viscous liquid copolymer was produced which contained about four ethylenimine moieties per fluorocarbon moiety based on an elemental analysis showing 16.8% nitrogen and 33.8% fluorine contents.

When this product was exposed to air at room temperature, it gradually changed to a hard tough solid stable to about 260° C. and insoluble in water, alcohol, acetone, benzene, fluorocarbon oil, and ether. This solid was apparently a highly crosslinked material formed by interaction of the olefinic double bonds present in the hexafluorobutenyl groups in the original copolymer. Films cast from the original liquid polymer or its solution in an organic solvent become upon standing hard clear coatings which are resistant to solvent attack. This change is accelerated by baking, preferably at about 50–200° C.

By the procedure of the above examples, other copolymers of similar nature are produced by the reaction of ethylenimine, propylenimine, or butylenimine with unsaturated fluorocarbons such as octafluorobutylene, tetrafluoropropyne, and dodecafluorohexene.

The water-soluble copolymers described above are useful as flocculants having extremely high efficiencies. When applied in a standard test at a concentration of 5 p.p.m. to raw sewage containing 957 p.p.m. of total solids, the water-soluble polymers formed by the reaction of ethylenimine with tetrafluoroethylene and hexafluoropropylene showed settling efficiencies similar to that of polyethylenimine, a known superior flocculating agent. These copolymers are particularly useful in that their properties can be adjusted to fit specific flocculation problems by changing the proportion of hydrophobic fluorinated alkyl to hydrophilic alkylene amine in their molecular structure as shown in the above examples.

An additional and valuable property of such copolymers is their ability to stabilize copper ions in water solution at concentrations which effectively inhibit and destroy undesirable aquatic plant growth. This is the subject of the copending application of one of us, Serial No. 235,505, filed November 5, 1962 now Patent No. 3,234,127.

Solid copolymers can be cast into hard non-brittle films or molded into conventional structural shapes, either alone or in combination with modifying or reinforcing materials, for example, glass fibers or cloth. They are specifically advantageous for making coatings and adhesives because of their strong adherence to metal and glass.

We claim:

1. A process for making a copolymer which comprises reacting by contacting at about 0° to about 80° C. from about 2 to about 25 moles of at least one vicinal lower alkylene imine with one mole of at least one monounsaturated aliphatic fluorocarbon of the formula $C_nF_{2n-2a}$ wherein $n$ is an integer from two to about six and $a$ is an integer from zero to one.

2. The process of claim 1 wherein the lower alkylene imine is ehtylenimine.

3. The process of claim 2 wherein the temperature is 30–70° C.

4. A process for making a copolymer which comprises reacting by contacting at about 30–70° C. from about three to about 20 moles of ethylenimine with one mole of at least one monounsaturated aliphatic fluorocarbon of the formula $C_nF_{2n-2a}$ wherein $n$ is an integer from two to about six and $a$ is an integer from zero to one.

5. The process of claim 4 wherein the unsaturated fluorocarbon is tetrafluoroethylene.

6. The process of claim 4 wherein the unsaturated fluorocarbon in hexafluoropropylene.

7. The process of claim 4 wherein the unsaturated fluorocarbon is hexafluoro-2-butyne.

8. The product prepared by the process of claim 1.

9. The copolymer of claim 8 wherein the alkylene amine is ethylenimine.

10. The copolymer of claim 8 wherein 3–20 moles of ethylenimine are combined with one mole of unsaturated aliphatic fluorocarbon.

11. The copolymer of claim 8 wherein the unsaturated aliphatic fluorocarbon is tetrafluoroethylene.

12. The copolymer of claim 8 wherein the unsaturated aliphatic fluorocarbon is hexafluoropropylene.

13. The copolymer of claim 8 wherein the unsaturated aliphatic fluorocarbon is hexafluoro-2-butyne.

14. A normally solid crosslinked copolymer consisting essentially of at least one acetylenic fluorocarbon of the formula $C_nF_{2n-2}$ wherein $n$ is an integer from one to about six and at least one vicinal lower alkylene imine chemically combined with one another, which copolymer contains, in chemically combined form, from 2 to 25 moles of alkylene imine per mole of acetylenic fluorocarbon.

15. The copolymer of claim 14 wherein the alkylene imine is ethylenimine.

16. The copolymer of claim 15 wherein the acetylenic fluorocarbon is hexafluoro-2-butyne.

References Cited

UNITED STATES PATENTS 3,234,127   2/1966   Teumac _____ 260—64

OTHER REFERENCES

Muroi et al.: Sen-i Gakkaishi, volume 15, 260–899, pp. 833–6 (1959).

JOSEPH L. SCHOFER, *Primary Examiner.*

J. F. McNALLY, J. A. DONAHUE, *Assistant Examiners.*